United States Patent

[11] 3,623,754

[72] Inventor James C. Moore
 Clackamas, Oreg.
[21] Appl. No. 86,817
[22] Filed Nov. 4, 1970
[45] Patented Nov. 30, 1971
[73] Assignee Portland Wire & Iron Company
 Portland, Oreg.

[54] CUSHIONING MOUNTING ASSEMBLY FOR VEHICLE GUARD CANOPY POST
 3 Claims, 4 Drawing Figs.
[52] U.S. Cl. .................................................. 287/20,
 296/102
[51] Int. Cl. .................................................. F16b 9/00
[50] Field of Search ................................. 287/20 R;
 296/102; 280/150 C; 248/10, 9

[56] References Cited
 UNITED STATES PATENTS
1,995,245 3/1935 Funk .......................... 248/9

3,036,858 5/1962 Fingerut ..................... 296/102
3,353,852 11/1967 Wood ......................... 287/20

Primary Examiner—David J. Williamowsky
Assistant Examiner—Andrew V. Kundrat
Attorney—L. R. Geisler ABSTRACT: A solid base member, rigidly secured on the vehicle, extends up, with slight all around clearance, into the bottom end of the tubular post for the canopy. A cross slot through the base member contains a cushioning mounting for a bolt which in turn supports the post. The cross slot and cushioning mounting are so shaped as to allow limited upward and sideward travel of the bolt and post relatively with respect to the base member but considerable cushioned travel relatively downwardly. A special resilient ring, secured at the top of the base member, engages the inside of the post and normally prevents metal-to-metal contact between base member and post, but the slight all around clearance makes the resilient mount act as a fixed connection upon very limited lateral swing of the post.

PATENTED NOV 30 1971
3,623,754
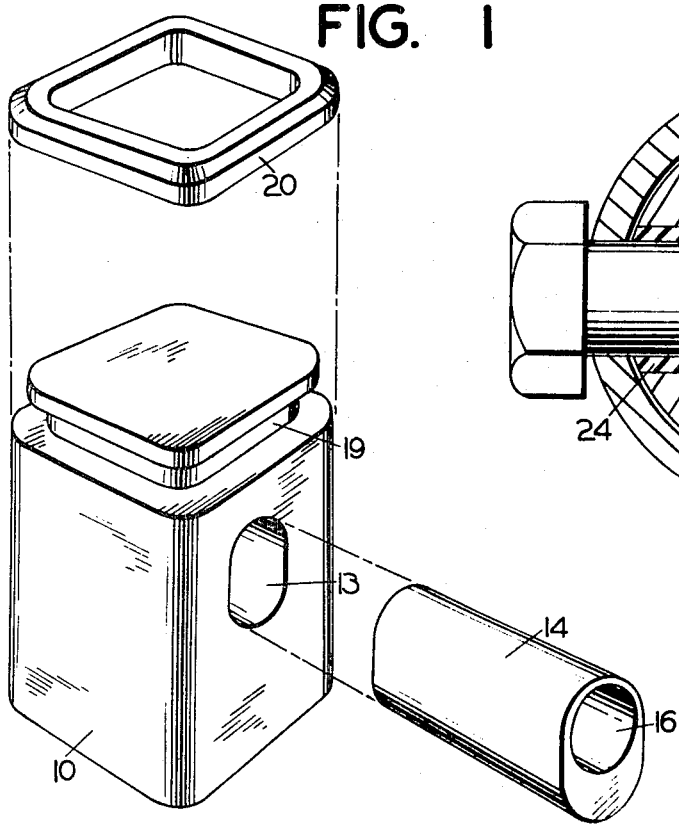
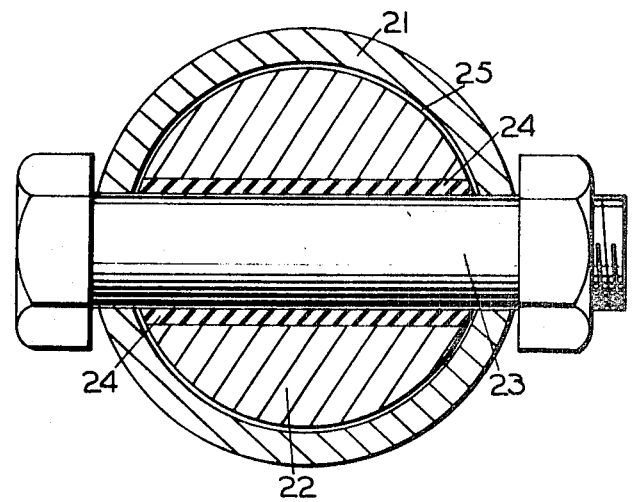
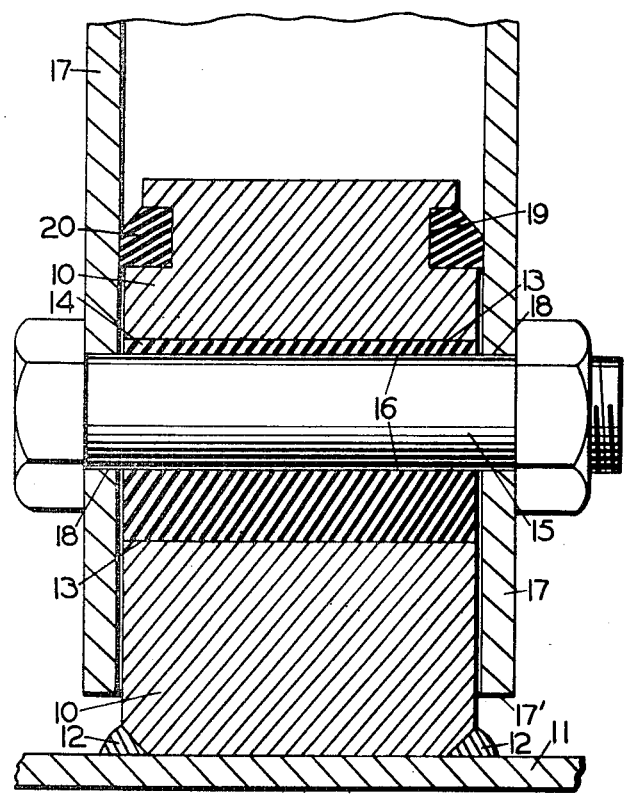
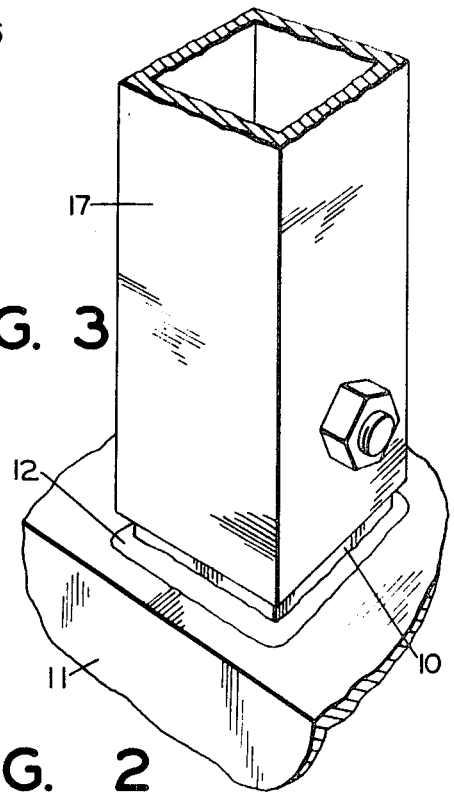
JAMES C. MOORE
INVENTOR.
BY *F.A.Geisler* ATTY.

CUSHIONING MOUNTING ASSEMBLY FOR VEHICLE GUARD CANOPY POST

BACKGROUND OF THE INVENTION

Guard canopies are customarily installed on such vehicles as tractors and heavy ground-working equipment in order to provide protection to the operator against falling timbers, trees, etc., and especially protection in the event the vehicle should overturn. Such canopies include strong, rigid, steel frames having four or more posts, generally of tubular construction so as to provide maximum strength and rigidity for the amount of metal used. Various means have been employed for securing the bottoms of the posts to the vehicle body.

Recently such means for securing the bottoms of the posts to the vehicle have included cushioning or shock-absorbing elements, since it was found that when the canopy posts are rigidly and unyieldingly secured to the vehicle the vibrations and shocks transmitted between the vehicle and the canopy frame will in time often produce failures in the mounting means or failures and breaks in certain parts of the canopy frame. An example of a canopy mount in which a flexible cushioning element is provided in the means by which the bottom of the canopy post is secured to the vehicle body is shown in U.S. Pat. No. 3,036,858, issued under date of May 29, 1962. However, the flexibility of the mount described in this patent prevents the mount from being suited to the present method used by the industry for testing guard canopies. The current testing method requires static testing in which, for example, a hydraulic ram is employed to exert a lateral thrust against the top of the canopy. To successfully withstand such tests only a very limited movement of the top of the canopy should be possible before the mount acts as a strong rigid connection between the canopy post and the vehicle frame.

The mounting assembly of the present invention has been developed taking into consideration the current testing method for tractor canopies and to accept the high loadings incurred during a static test of the structure. At the same time an object of the invention is also to provide cushioning of the vibrations and shocks transmitted to the canopy from the tractor during operation of the tractor and limiting the vibration and noise associated therewith from extending up into the canopy by preventing metal-to-metal contact for the most part between the canopy post and the tractor during normal tractor operation. In addition, this mounting means has the advantage of being suitable and practical for canopy posts of small as well as larger dimension.

SUMMARY OF THE INVENTION

The mounting means includes a solid metal base member which is rigidly secured to the vehicle frame and which is designed to extend up a short distance into the bottom end of the tubular canopy post. The cross-sectional size and shape of the base member corresponds to the interior periphery of the post, allowing for a slight all around clearance between the outside surface of the rigid base member and the interior surface of the post. A vertically elongated slot extends transversely through the base member and supports a cushioning bushing for a bolt which extends transversely through the bottom of the post and on which bolt the post rests. The bushing allows the bolt and supported post to have a limited upward and sideward travel and a greater amount of downward travel relatively with respect to the rigid base member. A resilient ring, secured on the top of the base member, presses against the inside surface of the post at all times and acts under normal conditions to keep the inside of the post and the rigid base member from metal-to-metal contact.

BRIEF DESCRIPTION OF THE DRAWINGS

In the accompanying drawings:

FIG. 1 is an exploded perspective view of the rigid base member by itself together with the two resilient cushioning elements carried by the base member;

FIG. 2 is a sectional elevation of the entire mounting assembly showing the rigid base member secured on the vehicle frame, the cushioning elements carried by the base member, the bottom portion of the canopy post, and the cross bolt on which the post rests;

FIG. 3 is a perspective view of the canopy mounting of FIG. 2 drawn to a smaller scale; and FIG. 4 is a horizontal section through the entire mounting assembly but illustrates the employment of the invention in the case where the tubular post for the canopy is round in cross section.

In FIGS. 1 and 2 the solid metal base member is indicated by the reference 10, and, as shown in FIG. 2, is rigidly secured to the vehicle frame 11 by welding 12. The base member 10 is formed with an oval or vertically elongated slot 13 extending horizontally and centrally through the base member. The slot 13 accommodates a bushing 14 of urethane, rubber, or other suitable resilient cushioning material, having a cylindrical channel 16 for a shaft or bolt 15 which is supported by the base member. It will be noted that the wall of the bushing 14 around the cylindrical channel 16 provided for the bolt is much thicker below the bolt channel than along the sides and top of the channel. Consequently the bushing 14 and the slot 13 allow very limited upward and sideward movement of the bolt with respect to the base member 10 but much more downward movement.

The bottom portion of the tubular post 17 (FIG. 2) for the canopy (not shown) is provided with a pair of registering holes 18 in opposite sidewalls to accommodate the shaft or bolt 15. The pair of holes in the tubular post are so located with respect to the bottom edge 17' of the post that the bottom edge of the post will be spaced above the vehicle frame 11 when the post is supported on the bolt extending through the bushing 14 in the slot 13 in the base member 10. At all times the post rests entirely on the bolt 15 which in turn is supported by the base member 10 through the intermediary of the cushioning bushing 14. Due to the shape of the slot 13 and bushing 14, as previously mentioned, the canopy post 17 is limited to slight relative upward movement and to slight relative movement to either side in the slot 13 with respect to the rigid base member, but is permitted considerably more downward movement relatively with respect to the base member. Thus the bottom end of the post is cushioned against actual contact with the vehicle frame.

The upper end of the base member is formed with a groove 19 extending entirely around the base member in which groove a resilient ring 20 is tightly held. The resilient ring 20, which is preferably of the cross-sectional shape shown in FIG. 2, is of sufficient thickness in its lower portion to exert a constant resilient thrust against the interior surface of the post 17. As a result, due to the slight all around clearance between the base member 10 and the inside face of the post, the resilient ring will, under most normal conditions, prevent metal-to-metal contact between the sides of the base member and the post.

The slot 13 and bushing 14 are so located and arranged in the base member 10 that the distance from the centerline or axis of the shaft or bolt 15 to the bottom of the solid rigid base member 10 and also to the bottom edge of said post will be greater than the distance from said centerline to the top of said post. As a result of this location of the centerline of the bolt any side thrust delivered to the top of the post sufficient to produce metal-to-metal contact between the post and a side of the rigid base member will result in initial contact being made at the bottom edge of the post against the bottom portion of the base member, with secondary 20 then occurring between the upper portion of the base member and the post at the opposite side. This will result in a more uniform initial yielding around the base member instead of concentrating the side stress between the post and base member more at the top of the base member, which would exert more of a tendency to cause buckling of the post. When the mounting assembly is formed with the dimensions subsequently mentioned as an example, the canopy post will be limited to approximately 1½° swing in any direction about the mounting bolt 15, beyond which the mounting assembly acts as a rigid connection.

Thus the mounting assembly as described has the feature of providing a cushioning effect for the canopy post during normal operation of the vehicle while also being better suited to withstand and oppose high moments of force produced at the base of the canopy post during the customary static test or roll test to which the vehicle canopy may be subjected.

It will be apparent that this mounting assembly can be used for tubular canopy posts of different size, provided the same relative dimensions for the members of the assembly are employed. The assembly was originally designed and tested, for example, with a 4-inch square tubular canopy post having a metal thickness of three-eighth inch and with 3/64-inch clearance on all sides between the inside surface of the post and the opposed surface of the rigid base member. The fact that this improved assembly can be used effectively and can be given the static and roll tests for vehicle canopies when the canopy in question has a post of smaller as well as larger dimensions is another feature of the invention.

The description thus far has covered the mounting assembly when used with a canopy post of square or rectangular cross section. The invention may also be employed with a round canopy post, as illustrated in FIG. 4. In FIG. 4 the round tubular canopy post is indicated by the reference 21, the solid rigid base member by the reference 22, the bolt extending through the base member, on which the post is supported, by the reference 23, the bushing in the vertically elongated transverse slot in the base member by the reference 24, and the all around clearance between the base member and the inside of the post by the reference 25. The top resilient ring on the rigid base member is not shown in the figure but it is to be understood that it is similar to the ring 20 of FIGS. 1 and 2 except that it is circular in shape. Similarly, the resilient top ring is held firmly in a top groove or by other suitable means at the top of the rigid base member. Thus it will be evident that the operation of the mounting assembly in this form will function in the same manner as the mounting assembly previously described with reference to FIGS. 1 and 2.

I claim:

1. A mounting assembly for securing a tubular post of a vehicle canopy to the vehicle, said assembly comprising a solid metal base member rigidly attached to the vehicle frame and extending up into the lower portion of the post, the outer periphery of said base member being similar to the inside periphery of said post but of smaller size allowing a slight all around clearance between said base member and said post, said base member having a slot extending transversely therethrough, a resilient bushing mounted in said slot, a shaft supported in said bushing, said shaft extending through a pair of registering holes in said post so positioned in said post that said post will be supported entirely on said shaft at all times with the bottom edge of said post spaced above the vehicle frame, and a cushioning ring extending around the top of said base member exerting resilient pressure against said post at all times and normally maintaining the all around clearance between said base member and said post, said post having a groove for firmly seating said cushioning ring.

2. The mounting assembly as set forth in claim 1 with said slot being vertically elongated in shape and with the wall of said bushing being considerably thicker at the bottom than at the sides and top.

3. The mounting assembly as set forth in claim 2 with said slot and said bushing so located and arranged that the distance from the centerline of said shaft to the bottom of said base member and also to the bottom edge of said post will be greater than the distance from said centerline of said shaft to the top end of said base member.

* * * * *

UNITED STATES PATENT OFFICE
CERTIFICATE OF CORRECTION

Patent No. 3,623,754      Dated November 30, 1971

Inventor(s) James C. Moore

It is certified that error appears in the above-identified patent and that said Letters Patent are hereby corrected as shown below:

On the cover page, the name of the Assignee should read -- Portland Wire & Iron Works --.

Signed and sealed this 24th day of October 1972.

(SEAL)
Attest:

EDWARD M. FLETCHER, JR.
Attesting Officer

ROBERT GOTTSCHALK
Commissioner of Patents